UNITED STATES PATENT OFFICE.

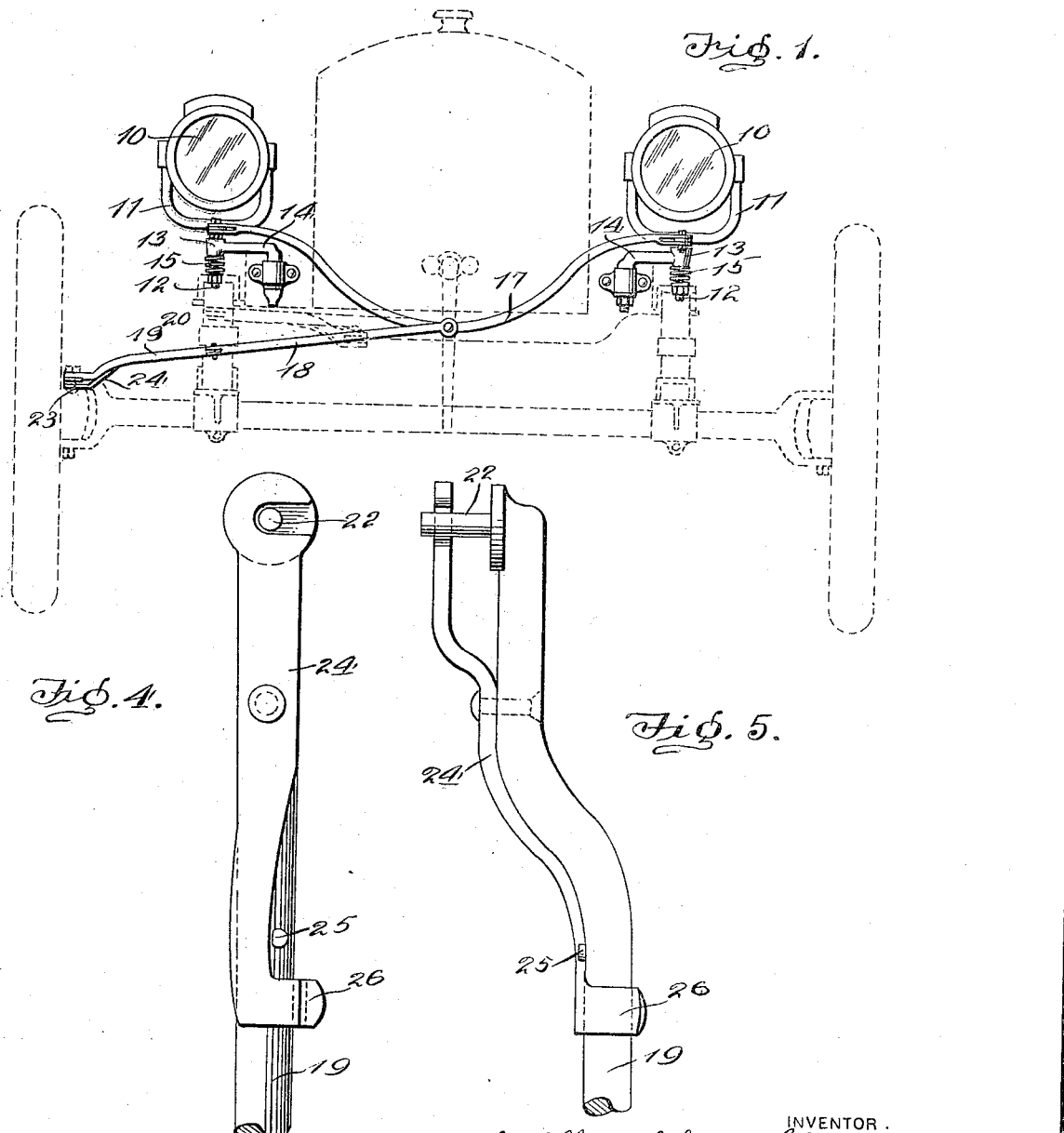

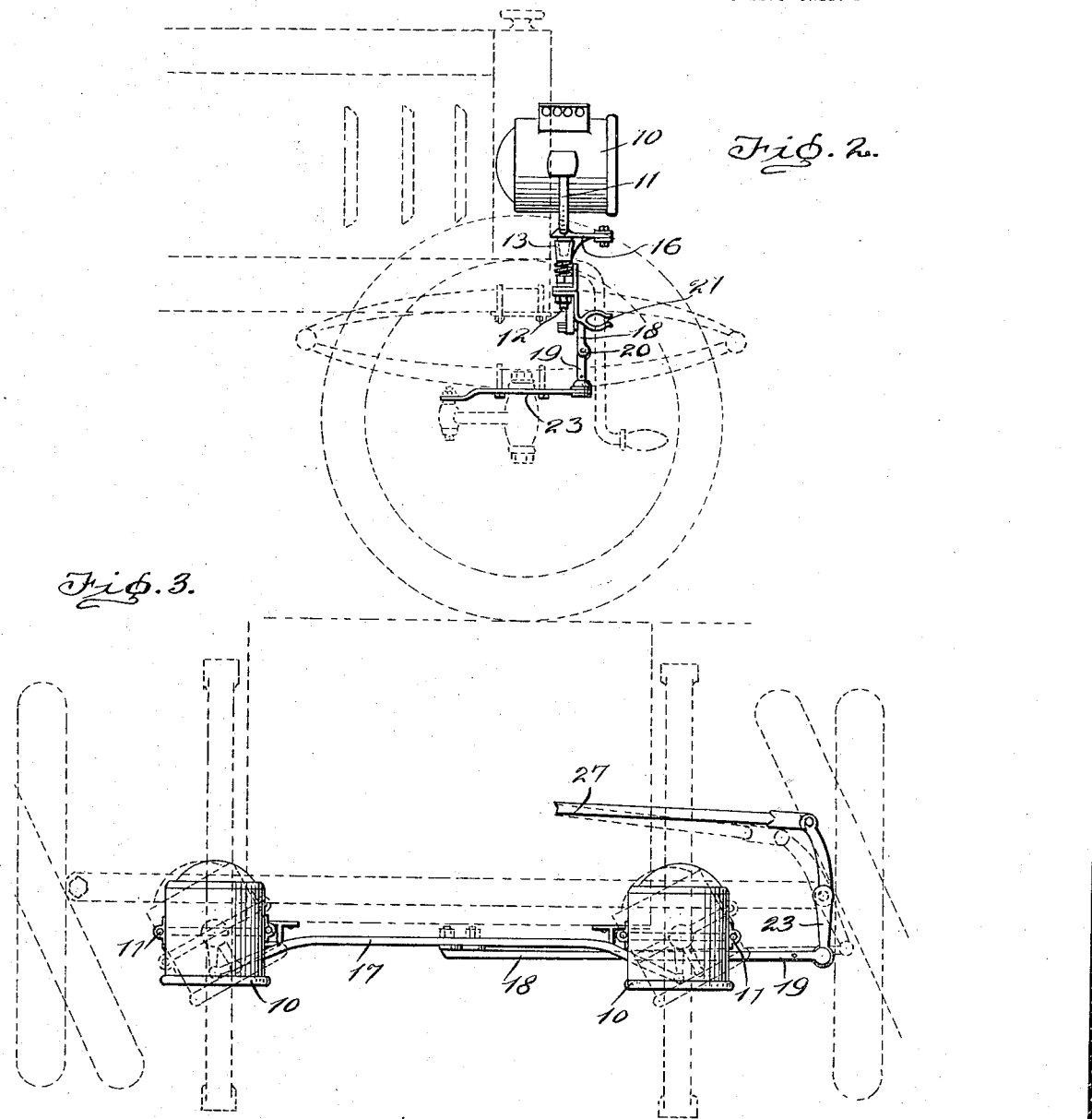

WILLOUGHBY A. SHIVE, OF TRUMBAUERSVILLE, PENNSYLVANIA.

DIRIGIBLE LAMP.

1,194,247.          Specification of Letters Patent.      Patented Aug. 8, 1916.

Application filed December 22, 1915. Serial No. 68,257.

*To all whom it may concern:*

Be it known that I, WILLOUGHBY A. SHIVE, a citizen of the United States, residing at Trumbauersville, in the county of Bucks and State of Pennsylvania, have invented certain new and useful Improvements in Dirigible Lamps, of which the following is a specification.

This invention relates to an improved means for mounting and actuating dirigible lamps or headlights for an automobile and the principal object of the invention is to provide a device which is so constructed that the lamps can be pivotally mounted and turned when the guiding wheels of the automobile are turned.

Another object of the invention is to provide a device so constructed that the lamps will be prevented from vibrating and rattling.

Another object of the invention is to provide a mechanism so constructed that it may be used for either a right or left hand guide and further to so construct the device that it may be disconnected from the steering wheel if desired.

Another object of the invention is to so construct the device that it will be very simple in construction and not liable to easily break or get out of order.

This device is illustrated in the accompanying drawings, wherein:—

Figure 1 is a view in front elevation showing the improved lamp and operating mechanism connected with an automobile indicated in dotted lines. Fig. 2 is a view in side elevation of the mechanism shown in Fig. 1. Fig. 3 is a top plan view of the lamps and operating mechanism, the turning rod being connected with the opposite side of the machine to that shown in Fig. 1. Fig. 4 and Fig. 5 are enlarged views of the end portions of the turning rod forming part of the mechanism.

The lamps or headlights 10 are carried by the yokes 11 which are provided with stems constituting pivot pins 12 which pass through the bearings 13 of the lamp brackets 14 and carry springs 15 serving to hold the stems or pivot pins 12 against vertical movement and thus prevent vibration which would cause rattling. These yokes are provided with lever arms 16 which extend in front of the machine and are pivotally connected with the bifurcated ends of the connecting bar or rod 17. Therefore when the bar or rod 17 is moved longitudinally, the yokes will be turned as indicated by dotted lines in Fig. 3. The turning rod or draw bar 18 is pivotally connected with the connecting bar or rod 17 and has its outer end portion 19 hingedly connected with the inner end portion as shown at 20 so that when desired, the outer end portion may be swung inwardly and the draw bar supported in the bracket or clamp 21. Of course when the draw rod is supported in this clamp bracket, the lights will remain stationary and will not turn with the machine. The free end of this draw bar is constructed as shown in Figs. 1, 4 and 5 and is provided with a pin 22 which passes through an opening in the lever arm 23 pivotally mounted upon the usual axle spindle. A lever clamp 24 is carried by the outer end portion of the draw bar and engages the pin 22 beneath the lever arm 23. Therefore the draw bar 18 will be releasably connected with the lever arm 23 and will be pivotally connected with the same so that when the lever arm 23 is turned with the spindle as the wheels move to the dotted line position shown in Fig. 3, the lamps will be turned with the wheels. This latch lever 24 is formed of resilient material so that it may be moved across the abutment pin 25 and is provided with a lug or finger 26 serving to limit its swinging movement in one direction.

When in use the lamp and actuating mechanism are mounted as shown clearly in the drawings with the draw bar connected with lever arm 23. The machine is then driven along the road, the usual steering mechanism being provided for the wheel spindles and including the rod 27 connected with the lever arm 23. When the machine is turned, the rod or bar 27 moves the lever arm 23 and through the medium of the draw bar 18 and connecting bar 17 turns the lamps in the direction that the wheels turn. Therefore the light thrown by the lamps will follow a curve in the road. I have therefore provided a very simple and efficient device for pivotally mounting the lamps of an automobile and turning the lamps with the wheels. I have further provided a device so constructed that the lamps may be turned with the wheels or may be left stationary if desired and have further provided a device which is simple in construction and not liable to easily break or get out of order.

What is claimed is:—

1. A device of the character described including lamp brackets, lamp carrying yokes pivotally supported by said brackets, arms extending from said yokes, a connecting rod pivotally connected with said arms, a draw bar pivotally connected with said connecting rod and having its outer end portion pivotally connected with the inner end portion, a lever arm adapted to be pivotally mounted and connected with a steering mechanism, a pin extending from the outer end portion of said draw bar to pivotally connect the draw bar with the lever arm, and a lever latch pivotally connected with the outer end portion of said draw bar and engaging said pin to releasably connect the draw bar with the lever arm.

2. A mechanism of the character described including pivotally mounted lamp yokes, arms extending from said lamp yokes, a connecting bar pivotally connected with said arms, a draw bar pivotally connected with said connecting bar, a lever arm adapted to be pivotally mounted and connected with a steering gear and having its outer end portion provided with an opening, a pin extending from the outer end portion of said draw bar for passing through the opening of said lever arm, and means for engaging said pin to releasably hold the same in the opening formed in said lever arm.

3. A mechanism of the character described including pivotally mounted lamp yokes, arms extending from said lamp yokes, a connecting bar pivotally connected with said arms, a draw bar pivotally connected with said connecting bar and having its outer end portion pivotally connected with the inner end portion whereby the outer end portion may be swung back against the inner end portion of the draw bar and the inner and outer end portions of the draw bar releasably connected with a supporting device, and means for releasably connecting the outer end portion of said draw bar with a steering gear.

4. A mechanism of the character described including a lamp yoke connecting bar, a draw-bar connected with said connecting bar, a lever arm adapted to be connected with a steering gear and having its outer end portion provided with an opening, a pin extending from said draw-bar for passing through the opening of said lever arm, and means for engaging said lever arm to releasably hold the pin in the opening formed in said lever arm.

5. A mechanism of the character described including pivotally mounted lamp yokes, arms extending from said lamp yokes, a connecting bar connected with said arms, a draw bar pivotally connected with said connecting bar, a stem extending from the outer end of said draw bar, a resilient lever latch pivotally connected with said draw bar to engage said stem and provided with a finger for limiting its pivotal movement in one direction by engagement with said draw bar, and a pin carried by said draw bar for engaging said lever latch to releasably hold the same in an operative position.

In testimony whereof I affix my signature in presence of two witnesses.

WILLOUGHBY A. SHIVE.

Witnesses:
HERBERT M. BITTING,
ALBERT A. SCHAUFELBERGER.

Copies of this patent may be obtained for five cents each, by addressing the "Commissioner of Patents, Washington, D. C."